No. 875,392. PATENTED DEC. 31, 1907.
F. J. TRAN & F. CAIS.
WORKMAN'S TIME RECORDER.
APPLICATION FILED JUNE 14, 1905.

6 SHEETS—SHEET 1.

Witnesses:
Edw. Lindmueller.
Jno. H. Oberlin.

Inventors:
Frank J. Tran and Frank Cais
By J. D. Fay
Their Attorney.

No. 875,392. PATENTED DEC. 31, 1907.
F. J. TRAN & F. CAIS.
WORKMAN'S TIME RECORDER.
APPLICATION FILED JUNE 14, 1905.

6 SHEETS—SHEET 2.

Witnesses:
Edw. Lindmueller.
Jno. F. Oberlin.

Inventors:
Frank J. Tran and Frank Cais
By J. D. Fay
Their Attorney.

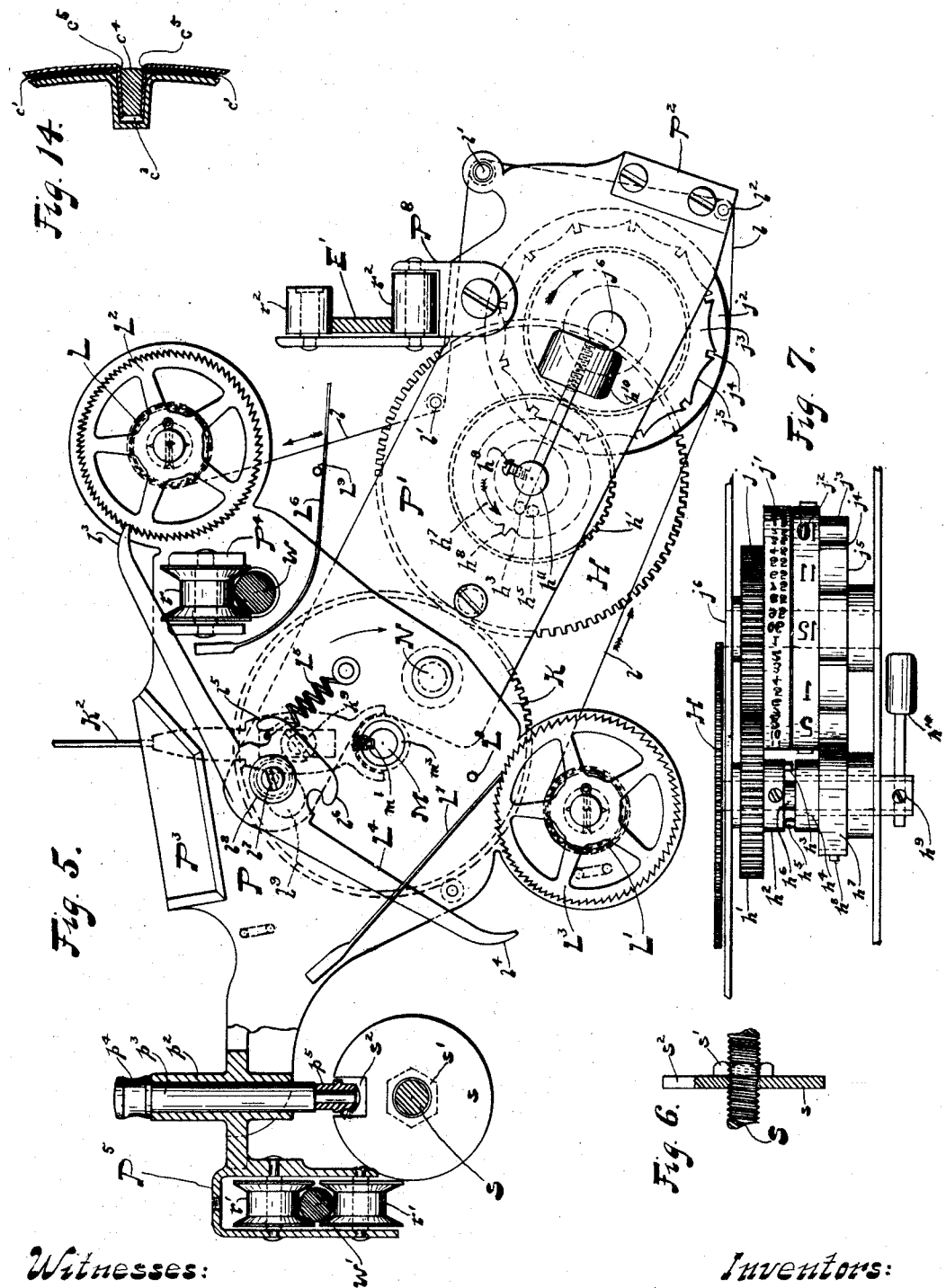

No. 875,392. PATENTED DEC. 31, 1907.
F. J. TRAN & F. CAIS.
WORKMAN'S TIME RECORDER.
APPLICATION FILED JUNE 14, 1905.
6 SHEETS—SHEET 6.
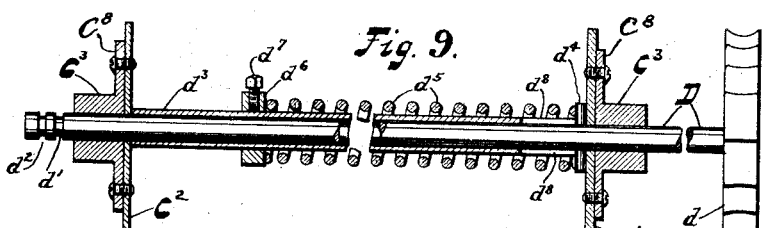
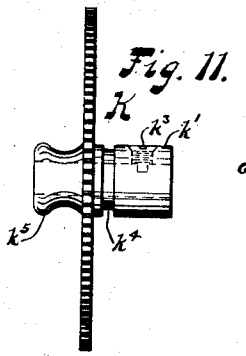
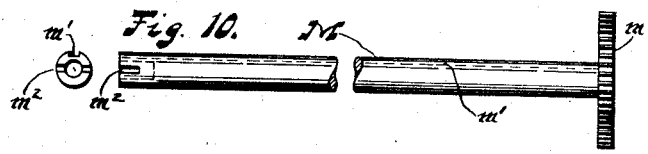
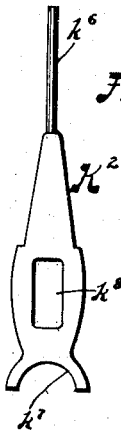
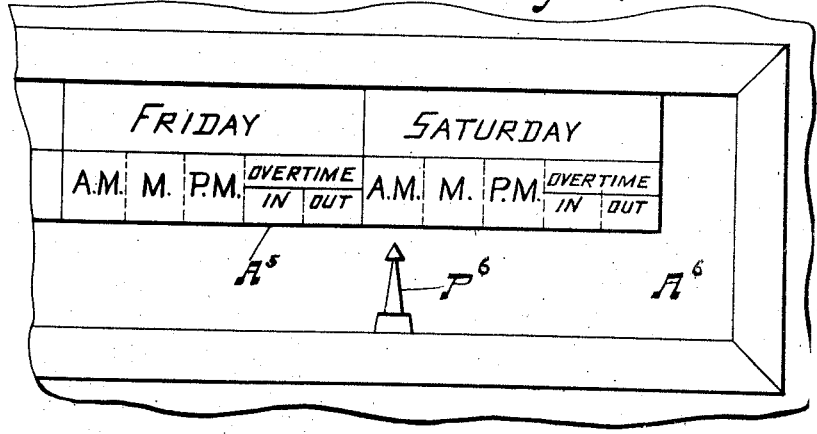
Witnesses:
Edw. Lindmueller.
Jno. F. Oberlin.
Inventors:
Frank J. Tran and Frank Cais
By their attorney.
J. O. Fay

UNITED STATES PATENT OFFICE.

FRANK J. TRAN AND FRANK CAIS, OF CLEVELAND, OHIO.

WORKMAN'S TIME-RECORDER.

No. 875,392.　　　Specification of Letters Patent.　　　Patented Dec. 31, 1907.

Application filed June 14, 1905. Serial No. 265,201.

*To all whom it may concern:*

Be it known that we, FRANK J. TRAN and FRANK CAIS, citizens of the United States, and residents of Cleveland, county of Cuyahoga, and State of Ohio, have invented a new and useful Improvement in Workmen's Time-Recorders, of which the following is a specification, the principle of the invention being herein explained and the best mode in which we have contemplated applying that principle so as to distinguish it from other inventions.

Our invention relates to the class of time recorders used in factories, stores and similar establishments, where it is found desirable to register the time of arrival and departure each day or several times each day of each of a large number of employees.

The object of the invention is to supply means whereby such registration may be expeditiously and accurately made, and the record thereof presented in convenient form for the computation of the wages of such employees.

To this end the invention consists in the combination, construction and arrangement of the various mechanisms and devices hereinafter described and particularly set forth in the claims.

The annexed drawings and the following description set forth in detail certain means embodying the invention, such disclosed means, however, constituting but one of various forms in which the principle of the invention may be used.

Figure 1:
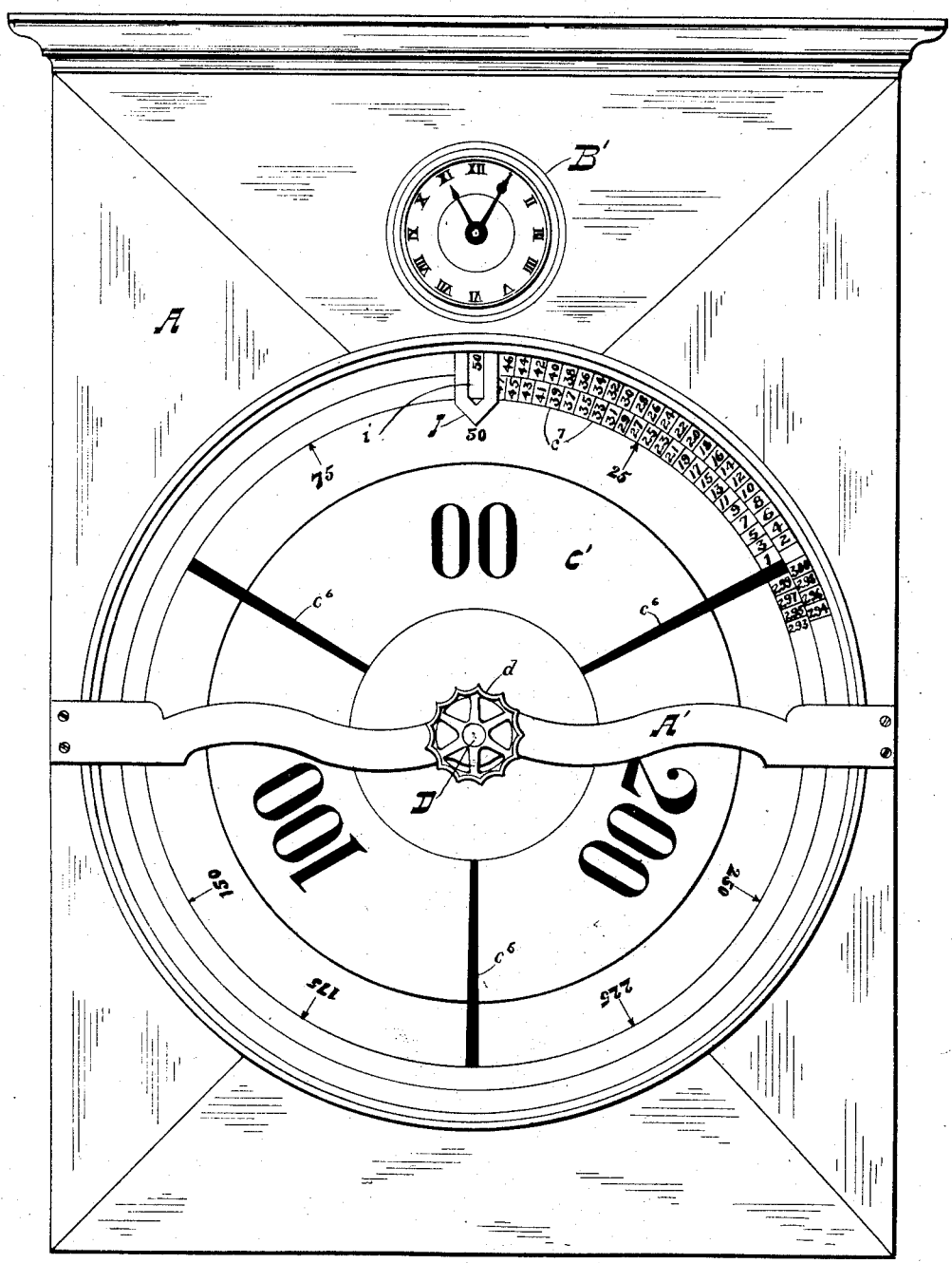
Figure 2:
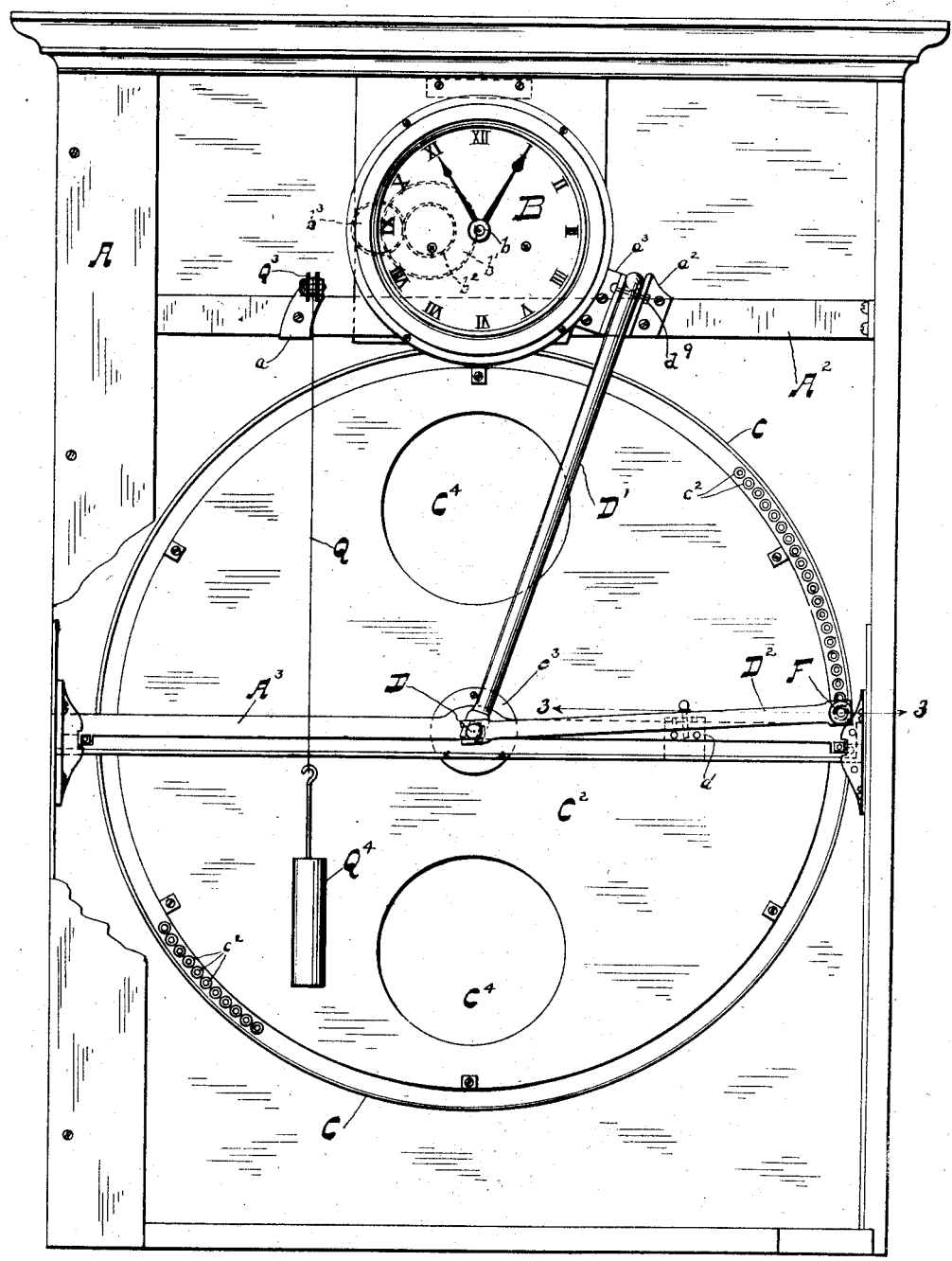
Figure 3:
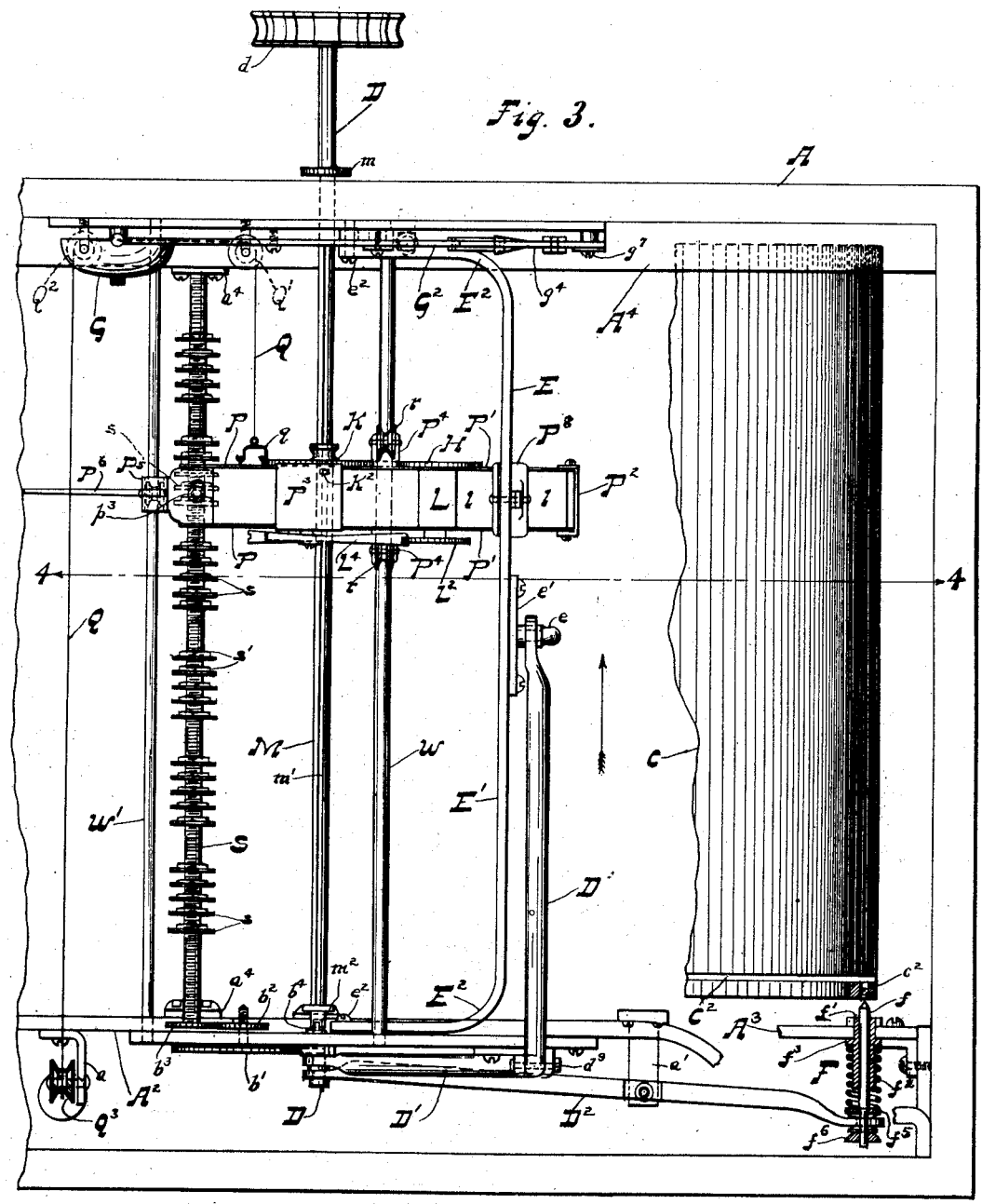
Figure 4:
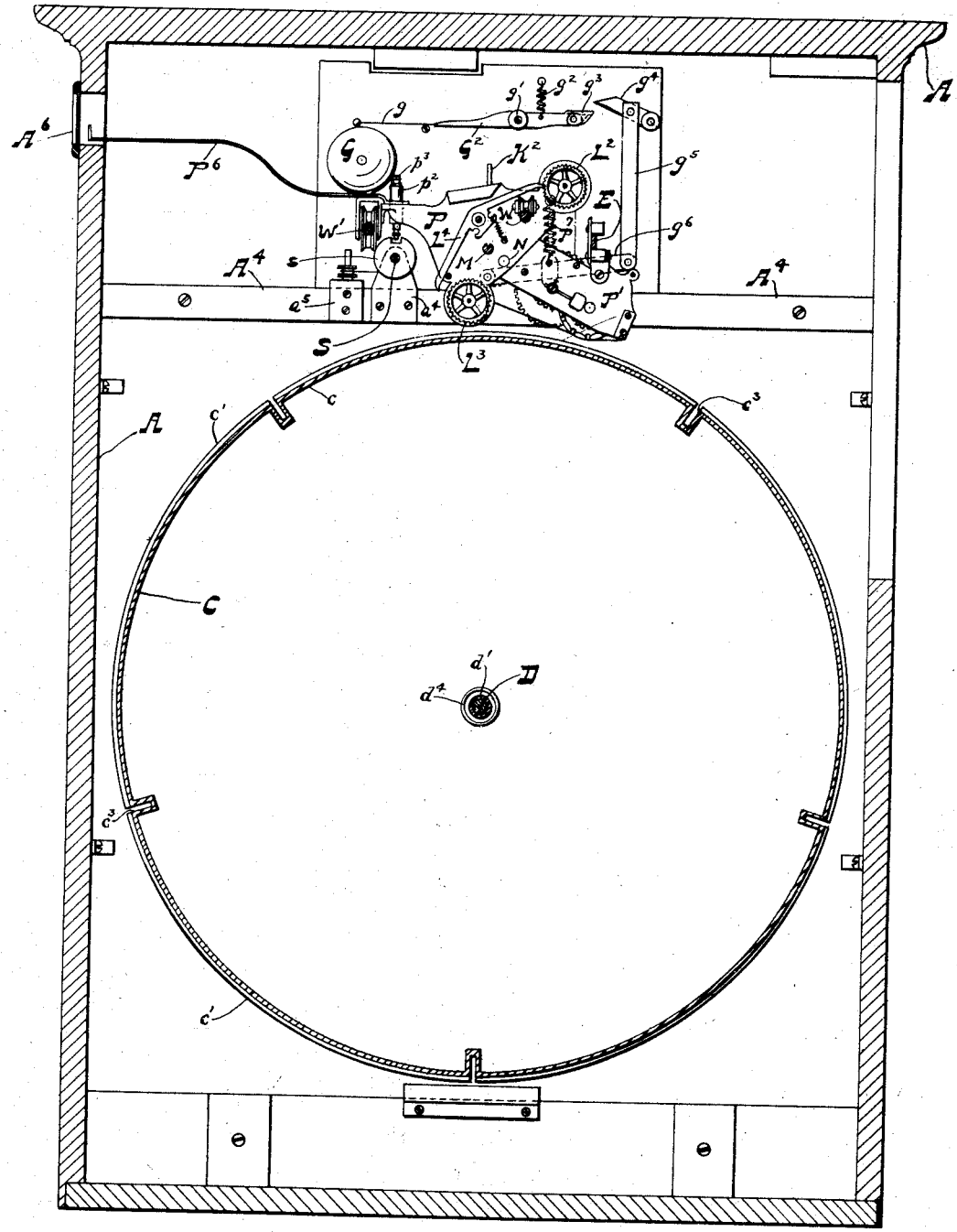

In said annexed drawings, Figure 1 represents a front elevation of the complete time recorder. Fig. 2 represents a rear elevation of the same, a portion of the inclosing case being broken away in order to disclose certain interior arrangements. Fig. 3 represents the arrangement of the parts of the time recorder as viewed from above, the top of the case and the clock mechanism being removed, and only a portion of the rotary platen being included, such portion together with the platen-locking device being shown as cut by a horizontal plane passing through the line 3—3, Fig. 2. Fig. 4 represents a vertical transverse cross-section of the casing and rotary platen as cut by a plane through the line 4—4, Fig. 3, the time printing device and annunciator being shown in elevation as viewed looking in the direction indicated by the arrow in said Fig. 3. Fig. 5 represents on an enlarged scale a side elevation of the time printing device viewed in the same direction as in Fig. 4, portions of the carriage frame at one end being broken away, and the ways upon which such carriage travels being shown in cross section. There is also shown in this figure one of a series of disks that, mounted upon a shaft, operate in connection with such carriage and form a feature of our time recorder. Fig. 6 represents one of said disks in vertical cross-section, a portion of the shaft upon which it is mounted being shown in elevation. Fig. 7 shows a detail of the time-printing device as viewed from above, the scale being the same as in Fig. 5. Fig. 8 represents a portion of a record sheet adapted to be used in our time recorder. Fig. 9 represents the operating shaft of the time recorder in side elevation, and the spindle of the rotary platen in longitudinal cross-section. Figs. 10, 11 and 12 represent in elevation upon a scale similar to that used in Fig. 5 various details of the time-printing device. Fig. 13 represents a portion of the indicating means employed to show the transverse position of the time-printing carriage relative to the platen. Fig. 14 represents in cross-section a portion of the platen and shows one means of securing the record sheet thereto.

Similar reference characters indicate corresponding parts in all the figures.

The various mechanisms of which the time-recorder is composed are inclosed within a suitable case A, being mounted upon and supported by the agreeably designed frame of such case of which only certain parts $A^1$, $A^2$, $A^3$ and $A^4$ are revealed in the various figures. Access to the interior of the case is had only through a door (not shown) which forms the rear of the case. This door is closed with lock and key in order to prevent any tampering with the mechanism of the recorder.

Centrally disposed in the front of the case, Fig. 1, is a circular opening within which fits the circular dial $C^1$. This dial $C^1$ is secured to and closes one end of a hollow rotary drum C the cylindrical surface of which forms the platen of the recorder. The other end of the drum, or platen, is closed by the circular portion $C^2$, Fig. 2, and the whole is rotatably supported within the case A by means of two cylindrical studs $C^3$ $C^3$, formed integral with plates $c^3$, $c^3$, Fig. 9, whereby such studs are centrally secured to the end portions $C^1$ $C^2$. These studs are journaled in bearings (not shown) provided in the frame pieces $A^1$ $A^3$. Openings $C^4$ $C^4$ are provided in the end portion $C^2$, through which convenient access may be had to the interior of the drum. The drum is preferably made of sheet metal, thus combining strength with lightness and making rotation of it easy. The outer cylindrical surface of the drum is covered with a layer of resilient material $c^1$, as rubber, upon which the record sheet, a portion of which is shown in Fig. 8, is laid. This sheet may be attached to the platen C in any approved manner. In the platen illustrated, the means of such attachment comprise a transverse slot $c^3$, Figs. 4 and 14, or plurality of such slots, where, as in the recorder illustrated, the diameter of the platen is large, in which the partly turned over ends $c^5$ of the record sheet or sheets are secured by a wedge $c^4$ of suitable thickness and breadth equal to the length of the slot.

The record sheet of which one, or a number, may be employed as indicated above to suit the size of the instrument and the convenience of the user, is divided into a number of equal transverse divisions consecutively numbered, the numbers corresponding to similar numbers assigned to the employees who are to use the recorder. Vertical lines further divide the sheet and form columns corresponding to intervals of time, as days. Of these there may be any number up to the capacity of the machine, the recorder shown being intended for six days and the sheet being correspondingly divided. These columns are suitably headed with the names of the appropriate days and under each heading are printed in sub-columns by means hereinafter to be described, the time of arrival of each employe in the morning indicated by the heading A. M., the time of his arrival in the afternoon indicated by the heading M., and the time of his departure in the evening, indicated by the heading P. M. It is here assumed that all the employees, as is usual, leave at the same time for lunch at noon. Similar headings in which to record the employee's arrival and departure when working "over time", and columns for such footings and calculations as it may be desirable to later place upon the sheet are provided as shown. These sheets are readily adapted to be bound in the manner usual in loose leaf accounting systems, and, combined with a permanent sheet on which is given the full name of each employee, his residence, the rate of his wages, and similar data, they form a complete record of this department of a firm's business.

Around the edge of the dial $C^1$, Fig. 1, which closes the front end of the platen, is arranged in a circle a series of spaces $c^7$ marked by suitable designating characters, preferably numbers, corresponding to the similarly designated transverse divisions of the record sheet borne by the platen. As shown these numbered spaces are arranged in staggered relation forming two concentric circles. To facilitate the picking out of any desired number, divisions of tens and hundreds may be indicated by dividing lines $c^6$ $c^6$. An index I, positioned as shown and having an opening $i$ just wide enough to allow a single numbered space to appear through it, serves to point out the number corresponding to the transverse division on the record sheet that is directly under the time-printing device.

Arranged in a circle about the outer edge of the rear end portion $C^2$ of the platen C, Fig. 2, is a series of sockets $c^2$, corresponding in number and position with the transverse divisions upon the record sheet carried by the platen. As the platen is rotated these sockets successively pass the locking device F. This device comprises a pin $f$ mounted in a hollow sleeve $f'$ and adapted to register in the sockets $c^2$. The sleeve $f'$ is secured to the frame piece $A^2$ and the pin $f$ is normally held out of contact with the sockets by a helical spring $f^2$ lying between an offset $f^3$ on the sleeve and a nut $f^5$, with its outer face curved, which is threaded on the pin. The pin is actuated to engage the sockets $c^2$ by means of a lever $D^2$, fulcrumed upon the bracket $a'$ which is attached to the frame piece $A^2$. This lever, as will appear later, is operated in conjunction with the contacting of the time-printing type-wheels on the platen, the object of the locking device being to accurately position the platen beneath such type-wheels and to keep it from rotating during the printing operation. The outer end of the pin $f$ fits loosely in a hole in the end of the lever $D^2$ being secured thereto by a second nut $f^6$, which has its inner face curved. It is evident that the tension of the spring $f^2$ may be varied by means of the nut $f^5$; also that the inner curved faces of nuts $f^5$ and $f^6$ permit the free oscillation of the lever $D^2$.

Above and transversely disposed relatively to the platen and parallel with each other are two parallel ways W, $W^1$, which form a track and a clock actuated spindle M, Fig. 3. The ends of the ways are suitably supported in the frame of the case A, in which are also provided bearings for the ends of the spindle. Mounted upon these ways and adapted to travel thereon is the carriage of the time-printing device shown in side elevation in Figs. 4 and 5, and as viewed from above in Fig. 3. This carriage is composed of two members, the first consisting of the side plates P, P, and cross plate $P^3$, the second, of the side plates $P^1$ $P^1$ and cross plate $P^2$. The first carriage member is supported upon the ways W $W^1$ by means of flanged rollers $r$ $r$ and $r^1$ $r^1$, mounted in brackets $P^4$ $P^5$ in the frame of the carriage member. These rollers are so disposed that the carriage member, while free to travel along the ways W W[1], is at the same time prevented from leaving such ways, being securely held thereon. The second carriage member is pivotally secured at one end to the first carriage member by a pin N passing through the side plates P P and P[1] P[1].

Time-printing type-wheels $j^1$ $j^2$ are mounted in the free end of this second member and the disposition of the ways on which the first carriage member travels, and of the type wheels in the second member, is such that upon depressing this free end the type-wheels contact with the platen beneath. They are normally held out of such contacting position by means of a helical spring P[7] connecting the two carriage members. To depress this second member and cause the type-wheels to print, a vibrating frame E is provided. This frame comprises the straight portion E[1] and two arms E[2] E[2] at substantially right angles thereto, which are pivoted to the frame of the case at $e^2$ $e^2$ as shown. The straight portion E[1] of this frame is designed to lie parallel with the ways W W[1] and just above the free end of the second carriage member, and it is secured to such member by the pair of rollers $r^2$ $r^2$ mounted in a bracket P[8]. The second carriage member thus freely slides along the vibrating frame E as the first carriage member travels along the ways W W[1] and it is readily seen that by depressing such vibrating frame, the free end of the second carriage member is likewise depressed no matter where it is positioned along the frame. Such depression of the vibrating frame and, thereby, of the free end of the second carriage member is effected by means of a bent lever D[1], Fig. 3, fulcrumed on pin $d^9$ in brackets $a^2$ $a^3$ secured to frame piece A[2]. The upper arm of the lever lies along the vibrating frame E and is secured to it near its mid point by the pin $e$ integral with the plate $e^1$, which is fastened to the frame E as shown. The other arm of the lever is disposed downwardly and when this lower arm is moved outwardly it is evident that the upper arm will be depressed, carrying with it the vibrating frame E. The manner of thus operating the lever D[1] is fully indicated elsewhere.

The before-mentioned clock-actuated spindle M passes through suitable openings $m^3$ $m^3$ in side plates P, P of the first carriage member. The clock mechanism B, Fig. 2, which actuates this spindle may be of any suitable and well known type, and hence, only its position is here shown. This position is preferably in the rear of the case A and above the platen C, the spindle M being in effect a continuation of the minute hand spindle $b$ of the clock. Practically we have connected it therewith by having a projection $b'$ on the end of such minute-hand spindle register in a slot $m^2$ in the end of the spindle M. The other end of the spindle M projects through the front of the case A, and by means of the gear wheel $m$, serves to rotate the hands of clock B[1] synchronously with the hands of the clock B in the rear.

The spindle M is provided with a groove $m^1$ along its entire length which permits the feathering thereto of the drive-wheel K, Fig. 5, which is mounted in the first carriage member and is connected to actuate synchronously with clock B, the time-printing type wheels mounted in the second carriage member. In its operative position this wheel K, which is without the side plate P of the first carriage member, lies flat against such side plate, its gear then meshing with the gear of wheel H similarly mounted in the second carriage member. The wheel K is held in such operative position by a detent K[2], the lower end $k^7$, Fig. 12, of which is adapted to register in a groove $k^4$ Fig. 11 encircling the part of the hub $k^1$ of the wheel which extends within the side plate P. This detent is secured to such side plate by means of a screw and washer $k^9$, the screw passing through the opening $k^8$ in the detent. The detent can thus be raised vertically from engagement with the wheel K and the wheel then moved along the spindle M away from the side plate P. To facilitate the disengagement of drive wheel K, the upper portion of the detent is fashioned into a finger piece $k^6$, and the outer portion $k^5$ of the hub of the wheel is rounded to form a knob. By disconnecting the mechanism of the printing device from the clock-actuated spindle in the manner just described, the time-printing type wheels are left free to be independently rotated and set. The drive wheel K is feathered to the spindle M by means of the screw $k^3$ in hub $k^1$ which registers in groove $m^1$ in the spindle.

The time-printing mechanism proper comprises, as has been already indicated, two type wheels, Figs. 5 and 7 one $j^1$ bearing upon its periphery characters for printing the minutes upon the record sheet, the other $j^2$ bearing upon its periphery characters for printing the hours upon the record sheet. These type wheels are mounted so that their printing faces lie in coincident planes and print upon a fixed point upon the platen. As shown, the two wheels are independently rotatable about the same axis $j^0$ and are of equal size, the characters being merely positioned farther apart on the hour than on the minute printing wheel. This mode of mounting and relationship in size, however, may be varied so long as the condition just expressed as to the position of the printing faces is complied with. The gear wheel H which meshes with the wheel K communicates its motion to the minute printing wheel $j^1$ through the agency of the gear wheels $h^1$ and $j$. The minute-printing wheel in turn is connected with the hour-printing wheel so as to rotate the latter one type space upon the completion of each rotation of its own. It is of course understood that the ratio existing between the various gear wheels intervening between the spindle M and the minute printing wheel $j^1$ is such that the latter makes one rotation in exactly one hour.

The proper intermittent rotary motion is given to the hour printing wheel $j^2$ by means of a star wheel $j^3$ fixed thereto and rotating therewith, provided on its periphery with the proper number of concave sections $j^5$ and intervening notches $j^4$ and the toothed wheel $h^7$ provided with a single tooth $h^3$, which is adapted to engage such notches $j^4$, and thus effect the rotation of wheel $j^2$ one type space for each rotation of wheel $h^7$. The convex portions of the periphery of wheel $h^7$, by fitting successively in the concave portions of the periphery of star wheel $j^3$, prevent any vibration of the hour wheel during the process of printing.

The toothed wheel $h^7$ rotates independently on the same axis $h^6$ as the gear wheel $h^1$, and is rotated thereby through the agency of two disks $h^4$ and $h^2$. These disks are respectively provided on their contiguous faces with projecting lugs $h^5$ and $h^3$, which are adapted to contact in the course of rotation of the disks; except when such lugs are thus in contact, disk $h^4$, with attached wheel $h^7$, is free to rotate about its axis, being normally held with its lug at a particular angle by a weighted arm $h^1$ secured to that portion $h^{11}$ of the common hub of the disk and wheel $h^7$ which projects without the side plate P of the carriage. In the course of the rotation of the disk $h^2$, lug $h^3$ thereon contacts with lug $h^5$ on disk $h^4$ in its normal position, and by its continued rotation carries such disk with it and raises the weighted arm $h^{10}$. When the weighted arm $h^{10}$ is raised to a vertical position over the axis, a slight additional movement will carry it beyond its center of gravity and it will fall to its normal position at once, effecting thus practically instantaneously the completion of the rotation of disk $h^4$ and attached wheel $h^7$. The relative positions of the lugs on the disks $h^2$ $h^4$, of the concave portions and notches on star wheel $j^3$, and of the tooth on wheel $h^7$ are all such that this instantaneous completion of the rotation of disk $h^4$ occurs exactly upon the completion of one rotation of the minute-printing wheel, and a new type space on the hour-printing wheel is thus advanced into position for printing.

In order to produce an impression of the time-printing type wheels upon the record sheet when the second carriage member is depressed in the operation of printing, a suitable inked-ribbon $l$ is provided. The ends of this ribbon are wound upon two reels L L$^1$ mounted in the first carriage member as shown, and the ribbon is thence led over rollers $l^1$ $l^2$ mounted in the second carriage member and across the printing faces of the type wheels. This inked ribbon is intermittently shifted from one reel to the other, coincidently with the operation of printing, by means of a reversibly operable ratchet device. As illustrated in the drawing this device is adjusted to wind the ribbon upon the upper reel L. The device comprises ratchet wheels L$^2$ L$^3$ respectively connected with the rolls L L$^1$, and provided with oppositely disposed teeth, and a pawl L$^4$ secured to the side plate P$^1$ of the second carriage member by means of a screw $l^7$ and washer $l^8$, a suitably shaped and disposed opening $l^9$ being provided in side plate P of the first carriage member to permit the passage therethrough of the screw and its free movement when the second member is depressed. The pawl L$^4$ has two similarly shaped arms $l^3$ $l^4$ adapted to engage respectively the ratchet wheels L$^2$ L$^3$ and two corresponding hooks $l^5$ $l^6$, of which either one is optionally engaged by the end of a helical spring L$^5$ whereby the appropriate arm of the pawl is brought into contact with the desired ratchet wheel. Springs L$^6$ L$^7$ are provided, adapted to lie in contact with the ratchet wheels so as to retard but not prevent their turning, means as pins L$^8$ L$^9$ being supplied by which such springs may be held out of such contacting position at will. The rotation of the ratchet wheel that is free from the action of the pawl may be thus retarded, the object being to prevent the ribbon from unwinding from one roll more rapidly than it is wound upon the other. As is evident from the foregoing description the pawl is adapted to rotate the ratchet wheel with which it is engaged by the oscillation of the end of the pivoted second member to which it is attached. By connecting the helical spring with first one then the other of the hooks $l^5$ $l^6$, the pawl is swung to operatively engage first one then the other of the ratchet wheels L$^2$ L$^3$, the proper spring L$^7$ or L$^6$ being adjusted at the same time to contact with the free ratchet wheel.

The carriage of the time-printing device is moved along the ways W W$^1$ from the rear to the front of the case by means of a weight Q$^4$ attached to one end of a cord Q, the other end of which is secured to the carriage by means of a staple $q$. This cord runs over grooved pulleys Q$^1$ Q$^2$ and Q$^3$ properly disposed to produce the desired movement of the carriage and preferably arranged so that the weight Q$^4$ is in the rear of the case in order that it may be manually raised to facilitate the returning of the carriage to its initial position. The motion of the carriage along its ways as has been indicated before, must be intermittent, in order that the time-printing type wheels may be successively positioned over the various columns in which the record sheet is divided. We, therefore, control the motion that the weight arrangement just described tends to produce, by a device which permits such weight arrangement to operate only at prearranged times and only for prearranged amounts. This device comprises a clock-actuated spindle S, Fig. 3, parallel with the ways W W', and the time actuated spindle M, already described, and lying beneath and in close proximity to the first carriage member of the printing device. Suitable gear wheels $b^1$, $b^2$ and $b^3$ connect this spindle with clock mechanism B so as to rotate said spindle once every twelve hours. Upon the spindle S are adjustably disposed a series of similar disks $s$, Figs. 5 and 6, each provided with a notch $s^2$ in its periphery. The manner in which we secure the disks to the spindle is by providing the latter with a screw thread and tapping the openings in the disks to fit such thread, whereby it is readily seen that the disks can be easily rotated about the spindle so as to be moved horizontally along the spindle and present the notches in their peripheries at any desired angles. To prevent turning and movement of the disks after once being positioned, a lock nut $s^1$ accompanies each one and firmly secures it.

That portion of the carriage of the printing device which lies above this shaft and series of disks is provided with a vertical socket $p^2$, Fig. 5, in which rests the pin $p^3$ provided at its upper extremity with a knob $p^4$, and at its lower extremity, which projects through the socket and into juxtaposition with such disks, with a roller $p^5$ rotating about a vertical axis. This projecting portion of the pin is adapted to contact with any of the disks $s$, and when in such contacting position prevents the motion of the carriage along the ways W W$^1$. However, as the rotation of the spindle S brings the notch in such contacting disk vertically above the shaft S, the pin passes through and by the disk, and the carriage is quickly drawn forward by the attached weight until the pin contacts with the next disk. In this position the carriage is in turn retained until the notch in this disk arrives in the proper position to permit further progress. Obviously by a proper disposition of these disks $s$ upon the clock-actuated spindle S, the printing device can be positioned for any succession of intervals of time over successive columns on the record sheet.

To reset the time printing device, the pin $p^3$ is raised out of contact with the disks, or even entirely removed from its socket, whereupon the weight $Q^4$ can be raised and the carriage brought back to its initial position in the rear of the case. The object of the roller $p^5$ on the lower extremity of the pin $p^3$ is to obviate unnecessary friction while the pin contacts with the rotating disk.

The arrangement of disks on the spindle as shown in Fig. 3 is designed to correspond with the suggestive arrangement of the columns on the record sheet already described. Thus the carriage as there positioned is in place to record the times of returning of the employees at noon of Friday, and such record would appear in a column under the abbreviation "M" beneath the heading "Friday" on the record sheet. The disk $s$ against which the pin $p^3$ is there resting has the notch in its periphery so disposed that the carriage will be allowed to pass one step farther at some time in the afternoon of Friday after the last of the employees shall have returned from lunch and before the first shall begin to leave in the evening. The time when this shifting of the carriage takes place is capable of exact adjustment since the notch in the disk can be fixed at any angle and the spindle S with which the disk rotates is actuated synchronously with clock B.

To operate the various mechanisms of the recorder other than those which are clock-actuated, an operating shaft D is provided. This shaft passes through openings in the studs $C^3 C^3$ upon which the platen rotates, and through a hollow sleeve $d^3$, which lies between said studs and is secured thereto so as to form, in effect, in conjunction with the studs, a hollow spindle for the platen. The shaft D projects a short distance beyond such hollow spindle at each end, being provided in the rear with two encircling grooves $d^1 d^2$, and in front with an operating knob or handle $d$ adapted to be readily grasped by one hand in order that the shaft may be either rotated or moved longitudinally. The hollow sleeve within the platen is provided at one end with a pair of oppositely disposed slots $d^8 d^8$ in which slides a pin or key $d^4$ secured in the shaft D. By means of such slots and pin the longitudinal movement of such shaft D is limited, and any rotary movement of the shaft is communicated directly to the platen. A helical spring $d^5$ surrounding the sleeve $d^3$ and pressing against the key $d^4$, normally retains such key against the end portion $C^1$ of the platen, a variable tension of the spring being secured by means of the adjustable collar $d^6$ which is secured to the sleeve by the set screw $d^7$. The grooves $d^1 d^2$ near the rear end of the operating shaft D are designed to receive the lower ends of the levers $D^1 D^2$, respectively, and are of sufficient width to permit the oscillation of such lever ends therein. These levers $D^1 D^2$, as has been previously stated, respectively serve to actuate the time-printing device and the platen-locking device when their lower arms are pushed outwardly. Such outward motion, it is evident, is effected by the horizontal movement of the shaft D within the hollow spindle of the platen. The slots $d^8 d^8$ in the spindle are of a length to permit only so much horizontal movement of the shaft as is necessary to cause the time-printing type wheels of the printing device to contact with the platen and the pin $f$ of the locking device to register in the socket $c^2$ that happens to be in position.

The manner of operating our time recorder can now be indicated in full. By means of the clock-actuated spindle and disks the time-printing device is kept properly positioned transversely relatively to the platen to print in the column corresponding to the day of the week and period of the day. The time-printing type wheels in such device are synchronized with the clock by means of the spindle M and connecting mechanism so as to be always prepared to print the current hour and minute. The employee desiring to register steps to the front of the recorder, grasps the knob $d$, and by means of it rotates the platen until the transverse division thereon bearing his number comes into position beneath the printing faces of the type wheels. This position is indicated to him by the appearance directly through the opening $i$ in the index I of his number on the rotating dial $C^1$. Having thus positioned the platen, he pushes the knob toward the case as far as it will go and then releases it, his registration being complete.

The operating shaft when thus pushed moves outwardly the lower arms of levers $D^2$ and $D^1$. Such movement of lever $D^2$ causes the locking device F to securely hold the platen; and such movement of lever $D^1$ depresses the vibrating frame E, and with it the free end of the second carriage member thus pressing the printing faces of the type wheels upon the record sheet and printing the time of registration thereon. The various helical springs, $d^5$ connected with the operating shaft, $f^2$ connected with the locking device, and $P^7$ connected with the carriage members of the time-printing device, all coöperate upon the release of the operating knob to immediately restore the various parts of the mechanism to their normal positions preparatory to another registration.

In order to indicate to the registering employee the completion of the printing operation, a suitable annunciator should be provided. To this end we have devised means comprising a bell and a striker adapted to ring the same coincidently with the depression of the time-printing type wheels into contact with the record sheet. The bell G, Fig. 4, is mounted within the case upon the front wall above the platen. The ringing means consists of a horizontally disposed lever G, fulcrumed at $g^1$ and having a striker $g$ at one end, and connected with a helical spring $g^2$ which tends to hold the striker in contact with the bell. Upon the other end of said lever is pivoted a catch $q^3$ which normally rests upon and projects beyond the end of the lever so as to be engaged by the hinged arm $g^4$ when the latter is depressed, but which tilts upwardly so as to permit the free return of such arm $g^4$ when the latter is raised. The arm $g^4$ is connected by means of arms $q^5$ $q^6$ to the vibrating frame E so that a slight depression of such frame E depresses arm $g^4$ sufficiently to engage catch $g^3$ on lever $g^1$ and raise striker $g$. Upon further depression of frame E the arm $g^4$ is disengaged from catch $q^3$ and allows the spring $g^2$ to cause the striker to ring the bell.

To readily indicate the transverse position of the printing device relative to the platen and record sheet carried thereon, a glass covered opening $A^6$ is provided along the entire length of one of the sides of the case and near its top. Along the opening is placed a card $A^5$ bearing divisions marked and arranged to correspond with the columns on the record sheet upon which the recorder has been adjusted to print. A pointer $P^6$ projects from the carriage of the time-printing device and indicates upon this scale the exact position of such device over the record sheet.

From the foregoing description of one form of our time recorder and its mode of operation, it is evident that in addition to various novel structural features and arrangements, our recorder embodies several principles of action that are unique in devices of this character. Thus an entirely automatic transverse positioning of the time-printing device is secured by means of the clock-actuated spindle and disks. Also by having the carriage in which the time-printing type-wheels are mounted, composed of two members the one pivotally secured to the other, it is possible to have such time-printing type-wheels rotated directly from the clock-actuated spindle without the intervention of flexible connections by which motion is lost and inaccurate records produced.

Other advantageous features of a general nature are the simplicity of the various mechanisms, the ease of operation and adjustment of the recorder and the impossibility of any one tampering with it or registering falsely.

Having thus described our invention in detail, that which we particularly point out and distinctly claim is:

1. In a workman's time-recorder, the combination with a platen, of a time-printing device embodying a carriage adapted to move intermittently across said platen, such carriage being composed of two members pivotally secured to each other.

2. In a workman's time-recorder, the combination with a platen, of a time-printing device embodying a carriage composed of two members pivotally secured to each other; and automatically operated means to position said carriage transversely relatively to said platen to correspond to intervals of time.

3. In a workman's time-recorder, the combination with a platen provided with a record-sheet having transverse divisions to correspond to individual workmen, and vertical divisions to correspond to intervals of time; a time-printing device embodying a carriage composed of two members pivotally secured to each other; means adapted to automatically position said carriage over said vertical divisions to correspond to the intervals of time there denoted; and manually operated means for bringing any one of said transverse divisions beneath said carriage.

4. In a workman's time-recorder, the combination with a platen, of a time-printing device comprising a carriage composed of two members, one of said members traveling on ways and the other being pivotally secured to said first member.

5. In a workman's time recorder, the combination with a platen, of a time-printing device comprising a carriage composed of two members, one of said members being movable transversely relatively to said platen, the other member being pivotally secured to said first member so as to be movable toward and away from said platen.

6. In a workman's time-recorder, the combination with a platen, of a time-printing device comprising a carriage composed of two members, one of said members being adapted to travel on ways transversely disposed relatively to said platen, and the other being pivotally secured to said first member so as to be movable toward and away from said platen.

7. In a workman's time-recorder, the combination of a rotary platen; ways transversely disposed relatively to said platen; a time-printing device comprising a carriage composed of two members, one of said members being adapted to travel on said ways, the other member being pivotally secured to said first member so as to be movable toward and away from said platen; means for automatically positioning said first member on said ways to correspond with intervals of time; and manually operated means to move said second member toward and away from said platen.

8. In a workman's time recorder, the combination of a platen; a time-printing device adapted to move transversely across said platen; a clock-actuated spindle parallel with the path of movement of said time-printing device and turning in fixed bearings; a driving wheel mounted in said device and feathered on said clock-actuated spindle; and typewheels mounted in said device and movable towards and away from said platen, said type-wheels being connected to be rotated by said driving-wheel.

9. In a workman's time-recorder, the combination of a platen; a time-printing device; automatically operated means adapted to position said device transversely relatively to said platen to correspond to intervals of time; a clock-actuated spindle parallel with the path of movement of said time-printing device and turning in fixed bearings; a driving wheel mounted in said device and feathered on said clock-actuated spindle; and type-wheels mounted in said device and movable towards and away from said platen, said type-wheels being connected to be rotated by said driving wheel irrespective of their position.

10. In a workman's time-recorder, the combination of a platen; ways transversely disposed relatively to said platen; a clock-actuated spindle parallel and co-extensive with said ways; said spindle being journaled in fixed bearings, and a time-printing device comprising a carriage adapted to travel on said ways; a driving-wheel mounted in said carriage and feathered on said clock-actuated spindle, and type-wheels mounted in said carriage so as to be movable towards and away from said platen, said type-wheels being connected to be rotated by said driving wheel irrespective of their position.

11. In a workman's time-recorder, the combination of a platen; ways transversely disposed relatively to said platen; a clock-actuated spindle parallel and co-extensive with said ways; and a time-printing device comprising a carriage composed of two members, one of said members traveling on said ways, the other being pivotally secured to said first member; a driving wheel mounted in said first member and feathered on said clock-actuated spindle; and type-wheels mounted in said second member and adapted to be rotated by said driving wheel.

12. In a workman's time-recorder, a time-printing device comprising in connection with an independently clock-actuated spindle a carriage member through which said spindle passes; a driving-wheel mounted in said carriage member and feathered on said spindle; a second carriage member pivotally secured to said first member; a type-wheel mounted in said second member and adapted to be rotated by said driving wheel; a second type-wheel similarly mounted; and means to rotate said second type-wheel one type-space at each revolution of said first type-wheel.

13. In a workman's time-recorder, a time-printing device comprising, in connection with a clock-actuated spindle turning in fixed bearings, a carriage member having a direction of movement parallel with such spindle; a driving wheel mounted in said carriage member and feathered on said spindle; a second carriage member pivotally secured to said first member; and type-wheels mounted in said second member and adapted to be rotated by said driving wheel.

14. In a workman's time-recorder, the combination with a spindle journaled in fixed bearings, of a carriage having a direction of movement parallel with said spindle, printing mechanism mounted on said carriage, and a driving wheel for said printing mechanism feathered on said spindle and detachably mounted in said carriage.

15. In a workman's time-recorder, the combination with a clock-actuated spindle, of a carriage having a direction of movement parallel with said spindle, time-printing mechanism mounted on said carriage, a driving wheel feathered on said spindle and having its hub provided with an encircling groove, and a movable detent mounted in said carriage and adapted to register in said groove to retain said wheel in engagement with said printing mechanism.

16. In a workman's time-recorder, a time-printing device comprising, in connection with a clock-actuated spindle turning in fixed bearings, a carriage member having a direction of movement parallel with such spindle; a driving wheel detachably mounted in said carriage member and feathered on said spindle; a second carriage member pivotally secured to said first member; and type-wheels mounted in said second member and adapted to be rotated by said driving wheel.

17. In a workman's time-recorder, a time-printing device comprising in connection with an independently clock-actuated spindle a carriage member through which such spindle passes; a driving wheel detachably mounted in said carriage member and feathered on said spindle; a second carriage member pivotally secured to said first member; and type-wheels mounted in said second member and adapted to be rotated by said driving wheel.

18. In a workman's time-recorder, the combination with a platen of a time-printing device comprising two members, one of said members being movable transversely relatively to said platen, the other being pivotally secured at one end to said first member; clock-actuated type-wheels mounted in said second member; and an inked ribbon adapted to be fed across the printing faces of said type-wheels.

19. In a workman's time-recorder, the combination of a platen; a time-printing device comprising two members, one of said members being movable transversely relatively to said platen, the other being pivotally secured to said first member so as to be movable toward and from said platen; clock-actuated type-wheels mounted in said second member; and an inked ribbon adapted to be fed across the printing faces of said wheels by the to and fro movement of said second member.

20. In a workman's time-recorder, the combination with a platen of a time-printing device comprising two members, one of said members being movable transversely relatively to said platen, the other being pivotally secured to said first member so as to be movable toward and away from said platen, clock-actuated type-wheels mounted in said second member, ribbon reels mounted in said first member and carrying an inked ribbon across the printing faces of said type-wheels, and a reversible ratchet device actuated by the movement of said second carriage member and adapted to unwind said ribbon from one reel and to wind it on the other.

21. In a workman's time-recorder, the combination of a platen; ways transversely disposed relatively to said platen; a time-printing device comprising a carriage composed of two members, one of said members being adapted to travel on said ways, the other being pivotally secured to said first member so as to be movable toward and away from said platen; and a vibratory frame parallel with said ways and lying in contact with said second member whereby said member may be moved toward said platen irrespective of the position of said carriage on said ways.

22. In a workman's time-recorder the combination of a rotary platen; an operating shaft centrally mounted in said platen and keyed thereto so as to be longitudinally movable; fixed ways transversely disposed relatively to said platen; a printing device comprising a carriage composed of two members, one of said members being adapted to travel on said ways, the other being pivotally secured to said first member so as to be movable toward and from said platen; a spring normally holding said second member away from said platen; and means connecting said second member with said operating shaft whereby said member is moved toward said platen when said shaft is moved longitudinally.

23. In a workman's time-recorder, the combination of a rotary platen; an operating shaft centrally mounted in said platen and keyed thereto; a record-sheet carried on said platen and having transverse divisions; a series of sockets in the end of said platen correspondingly disposed; and a pin connected with said operating shaft and adapted to engage said sockets.

24. In a workman's time-recorder, the combination of a platen, a time-printing device composed of two members, one of said members being pivotally secured to the other; manually operated means adapted to swing said pivoted member toward and away from said platen; and an annunciator comprising a bell, a lever provided with a striker at one end and a catch member at the other; a spring connected with said lever and tending to hold said striker in contact with said bell, a trip-arm connected with said manually operated means, and adapted to engage said catch to raise said striker from said bell and then to release said catch.

25. In a workman's time-recorder, the combination of a hollow, rotatable spindle; a cylindrical platen mounted thereon; an operating shaft within said spindle adapted to rotate said spindle and to be moved longitudinally therein; a spring opposing such longitudinal movement; ways transversely disposed relatively to said platen; a printing device comprising a carriage composed of two members, one of said members being adapted to travel on said ways, the other being pivotally secured to said first member so as to be movable toward and away from said platen; a spring normally holding said second member away from said platen; and a bent lever having one arm connected with said second member and the other with said operating shaft, and connected to move said second member toward said platen when said operating shaft is moved longitudinally.

26. In a workman's time-recorder, the combination of a cylindrical platen; a series of sockets in the end of said platen; a pin adapted to engage said sockets; a hollow spindle to which said platen is secured; a shaft within said spindle and keyed thereto so as to rotate therewith and be movable longitudinally therein; an operating handle at one end of said shaft and a lever at the other end, one arm of said lever being connected to said shaft, the other to aforesaid pin.

27. In a workman's time-recorder, the combination of a rotary platen mounted on a hollow spindle; an operating shaft within said spindle and keyed thereto so as to rotate therewith and be movable longitudinally therein; a series of sockets in the end of said platen; a pin adapted to engage said sockets; a spring to normally hold said pin out of such engagement; and a lever, having one arm connected with aforesaid shaft and the other with said pin and adapted upon the longitudinal movement of said shaft to actuate said pin.

Signed by us this 29th day of May, 1905.

FRANK J. TRAN.
FRANK CAIS.

Attested by—
G. W. SAYWELL,
JNO. F. OBERLIN.